United States Patent
Kinjou et al.

(10) Patent No.: US 12,047,843 B2
(45) Date of Patent: Jul. 23, 2024

(54) ENVIRONMENT ESTIMATION DEVICE

(71) Applicant: NTT DOCOMO, INC., Chiyoda-ku (JP)

(72) Inventors: Kazuki Kinjou, Chiyoda-ku (JP); Tomohiro Nakagawa, Chiyoda-ku (JP); Kazuya Sasaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 262 days.

(21) Appl. No.: 17/633,511

(22) PCT Filed: Oct. 1, 2020

(86) PCT No.: PCT/JP2020/037448
§ 371 (c)(1),
(2) Date: Feb. 7, 2022

(87) PCT Pub. No.: WO2021/066105
PCT Pub. Date: Apr. 8, 2021

(65) Prior Publication Data
US 2022/0295228 A1    Sep. 15, 2022

(30) Foreign Application Priority Data

Oct. 3, 2019    (JP) .................................. 2019-183121

(51) Int. Cl.
*H04W 4/00*      (2018.01)
*G01S 19/46*     (2010.01)
(Continued)

(52) U.S. Cl.
CPC ............. *H04W 4/029* (2018.02); *G01S 19/46* (2013.01); *H04W 4/023* (2013.01)

(58) Field of Classification Search
CPC ........ H04W 4/029; H04W 4/023; G01S 19/46
See application file for complete search history.

(56) References Cited

U.S. PATENT DOCUMENTS

2013/0184008 A1    7/2013    Terada et al.
2020/0292716 A1    9/2020    Aoyama

FOREIGN PATENT DOCUMENTS

JP      5038793 B2 *  10/2012   ........... G01S 5/0236
JP      2012-235535 A   11/2012
(Continued)

OTHER PUBLICATIONS

International Preliminary Report on Patentability and Written Opinion issued Apr. 14, 2022, in PCT/JP2020/037448, 6 pages.
(Continued)

*Primary Examiner* — Erika A Washington
(74) *Attorney, Agent, or Firm* — Oblon, McClelland, Maier & Neustadt, L.L.P.

(57) ABSTRACT

An environment estimation device 1 includes: an information storage unit 11 configured to store base station information in which a serving timing at which a mobile terminal 2 is served in a radio communication range of a base station 3 and environment information indicating an environment of the base station 3 are correlated; an information acquiring unit 10 configured to acquire position information including position data of the mobile terminal 2 acquired by positioning and a positioning timing; and an estimation unit 13 configured to estimate, based on the positioning timing included in the position information of the mobile terminal 2 acquired by the information acquiring unit 10 and the base station information stored in the information storage unit 11, an environment of the mobile terminal 2 at a position indicated by the position data included in the position information.

14 Claims, 12 Drawing Sheets

(51) Int. Cl.
*H04W 4/02* (2018.01)
*H04W 4/029* (2018.01)

(56) References Cited

FOREIGN PATENT DOCUMENTS

| JP | 2018-141721 A | 9/2018 |
| WO | WO 2012/108539 A1 | 8/2012 |
| WO | WO 2017/170005 A1 | 10/2017 |

OTHER PUBLICATIONS

International Search Report mailed on Dec. 8, 2020 in PCT/JP2020/037448 filed on Oct. 1, 2020 (2 pages).

* cited by examiner

Fig.5

| USER IDENTIFIER | POSITIONING TIMING | LATITUDE | LONGITUDE |
|---|---|---|---|
| 0 | 9:10 | 35.4820 | 139.7209 |
| 1 | 22:45 | 36.0921 | 139.3390 |
| ... | ... | ... | ... |

Fig.6

| USER IDENTIFIER | SERVING TIMING | BASE STATION ID |
|---|---|---|
| 0 | 11:21 | 590 |
| 1 | 9:10 | 200 |
| ⋮ | ⋮ | ⋮ |

*Fig.7*

| BASE STATION ID | ENVIRONMENT INFORMATION |
|---|---|
| 590 | INDOORS |
| 200 | OUTDOORS |
| ⋮ | ⋮ |

ENVIRONMENT ESTIMATION DEVICE

TECHNICAL FIELD

An aspect of the present disclosure relates to an environment estimation device that estimates an environment of a mobile terminal.

BACKGROUND ART

Patent Literature 1 discloses an indoor/outdoor determination program for performing an operation of determining whether a mobile terminal is present indoors or outdoors.

CITATION LIST

Patent Literature

[Patent Literature 1] PCT International Publication No. WO 2017/170005

SUMMARY OF INVENTION

Technical Problem

The indoor/outdoor determination program determines whether a mobile terminal is present indoors or outdoors based on elevation angle information and satellite azimuth angle information of a plurality of GPS satellites. Without performing complicated processes based on the elevation angle information and satellite azimuth angle information of a plurality of GPS satellites in this way, it is not possible to determine whether a mobile terminal is present indoors or outdoors, that is, it is not possible to determine an environment of a mobile terminal Therefore, there is demand for easily estimating an environment of a mobile terminal.

Solution to Problem

According to an aspect of the present disclosure, there is provided an environment estimation device that is comprised in a communication system comprising a plurality of pieces of radio equipment and a mobile terminal capable of performing radio communication with each of the plurality of pieces of radio equipment when the mobile terminal is served in a radio communication range of the corresponding radio equipment, the environment estimation device comprising: a storage unit configured to store radio equipment information in which a serving timing at which the mobile terminal is served in the radio communication range of the radio equipment and environment information indicating an environment of the radio equipment are correlated; an acquisition unit configured to acquire position information comprising position data of the mobile terminal acquired by positioning and a positioning timing; and an estimation unit configured to estimate, based on the positioning timing comprised in the position information of the mobile terminal acquired by the acquisition unit and the radio equipment information stored in the storage unit, an environment of the mobile terminal at a position indicated by the position data comprised in the position information.

According to this aspect, an environment of a mobile terminal at a position indicated by position data included in position information is estimated based on a positioning timing included in acquired position information of the mobile terminal and stored radio equipment information. That is, it is possible to more easily estimate an environment of a mobile terminal based on position information and radio equipment information.

Advantageous Effects of Invention

According to the aspect of the present disclosure, it is possible to more easily estimate an environment of a mobile terminal.

BRIEF DESCRIPTION OF DRAWINGS

FIG. 5 is a diagram illustrating a table example of position information.

FIG. 6 is a diagram illustrating a table example of base station positioning information which is a part of base station information.

FIG. 7 is a diagram illustrating a table example of base station data which is a part of the base station information.

DESCRIPTION OF EMBODIMENTS

Hereinafter, an embodiment of the present disclosure will be described in detail with reference to the accompanying drawings. In describing the drawings, the same elements will be referred to by the same reference signs and repeated description thereof will be omitted. The embodiment of the present disclosure in the following description is a specific example of the invention, and the invention is not limited to the embodiment unless there is particular description for limiting the invention.

Figure 1:
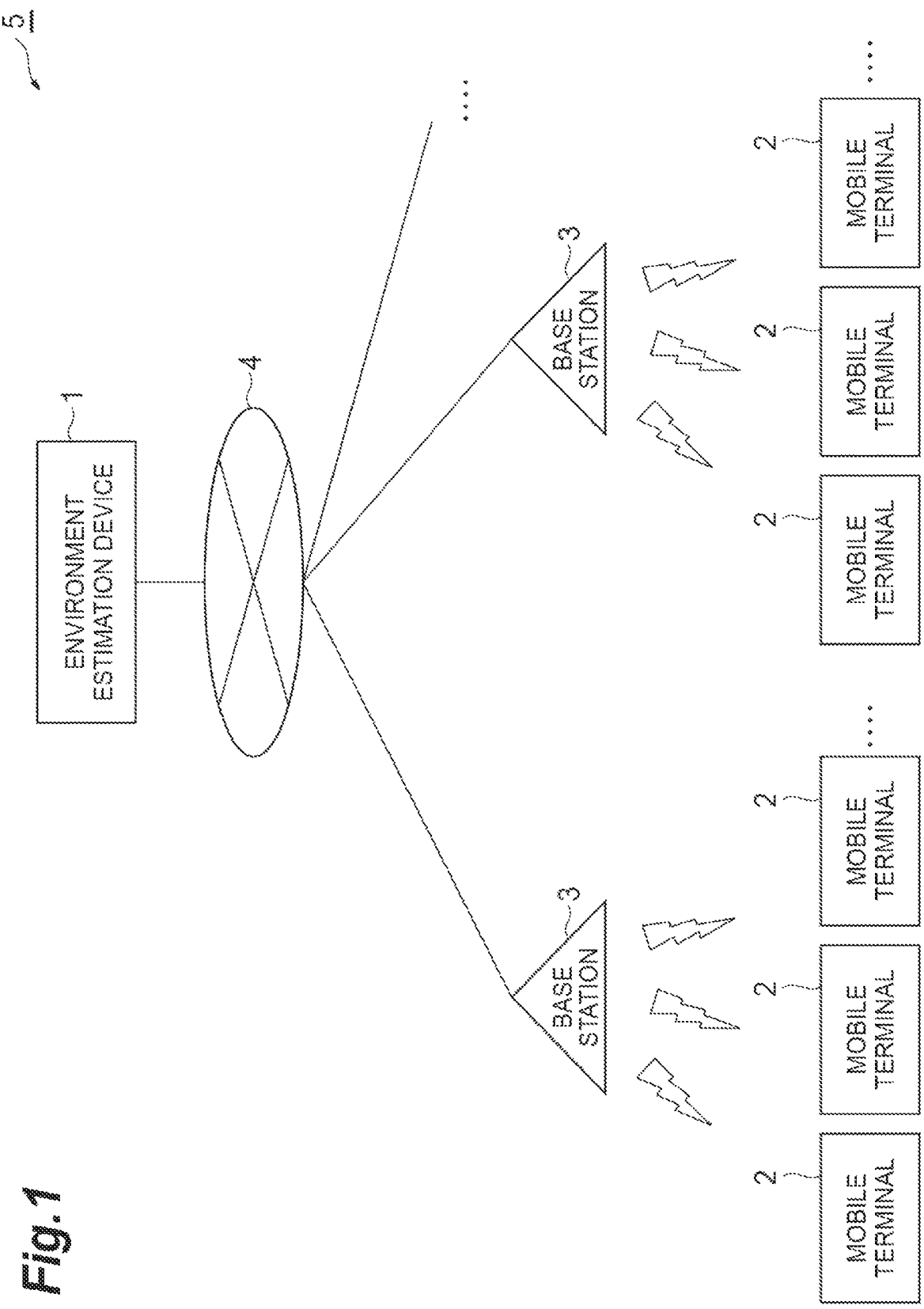
FIG. 1 is a diagram illustrating an example of a system configuration of an environment estimation system including an environment estimation device according to an embodiment.

FIG. 1 is a diagram illustrating an example of a system configuration of an environment estimation system 5 including an environment estimation device 1 according to an embodiment. As illustrated in FIG. 1, the environment estimation system 5 includes an environment estimation device 1, (one or more) mobile terminals 2, (one or more)

base stations 3 (radio equipment), and a network 4. The constituents of the environment estimation system 5 will be described below.

The environment estimation device 1 is a computer device such as a server device that estimates an environment of a mobile terminal 2 at an arbitrary position. The environment may be replaced with a situation. An environment of a mobile terminal 2 is an environment or a situation in which the mobile terminal 2 is placed. The environment may include at least one of being indoors (inside a building) and being outdoors (outside a building). For example, the environment estimation device 1 may estimate that the mobile terminal 2 is present indoors (a probability of being indoors) at an arbitrary position, may estimate that the mobile terminal 2 is present outdoors (a probability of being outdoors) at an arbitrary position, or may estimate that the mobile terminal 2 is present indoors or outdoors (a probability of being indoors or outdoors). The environment is not limited to being present indoors and being present outdoors. Examples of the environment include being present on the ground, being present underground, being present on an n-th floor (of a building or the like) (where n is an integer (including negative numbers)), a temperature, a humidity, an atmospheric pressure, a degree of congestion (of people or the like), a noise level, a field of sight, a speed, an acceleration, a latitude, a longitude, a position, an altitude, a region, and a country. Details of the environment estimation device 1 will be described later.

The mobile terminal 2 is a computer device that can perform radio communication with a base station 3 by being served in a radio communication (geometric) range (for example, a cell range) of the base station 3 (being included in the range). In this embodiment, the base station 3 is supposed to be a general base station in a mobile communication system, and the mobile terminal 2 is supposed to be a smartphone that performs mobile communication via the base station 3, but the present disclosure is not limited thereto. For example, the base station 3 may be a router of a wireless local area network (LAN) such as WiFi (registered trademark), and the mobile terminal 2 may be a wireless LAN terminal that can perform wireless LAN communication with the base station 3. For example, the base station 3 may be a router of short-range radio communication (including a beacon using Blutetooth Low Energy (BLE)) such as Bluetooth (registered trademark), and the mobile terminal 2 may be a short-range radio communication terminal that can perform short-range radio communication with the base station 3. The mobile terminal 2 performs radio communication with the base station 3 in which the mobile terminal is served and performs communication with the Internet or another mobile terminal 2 via the network 4. The mobile terminal 2 is carried by a user of the mobile terminal 2. It is assumed that the mobile terminal 2 includes devices of sensors and functions of a general smartphone.

Figure 2:
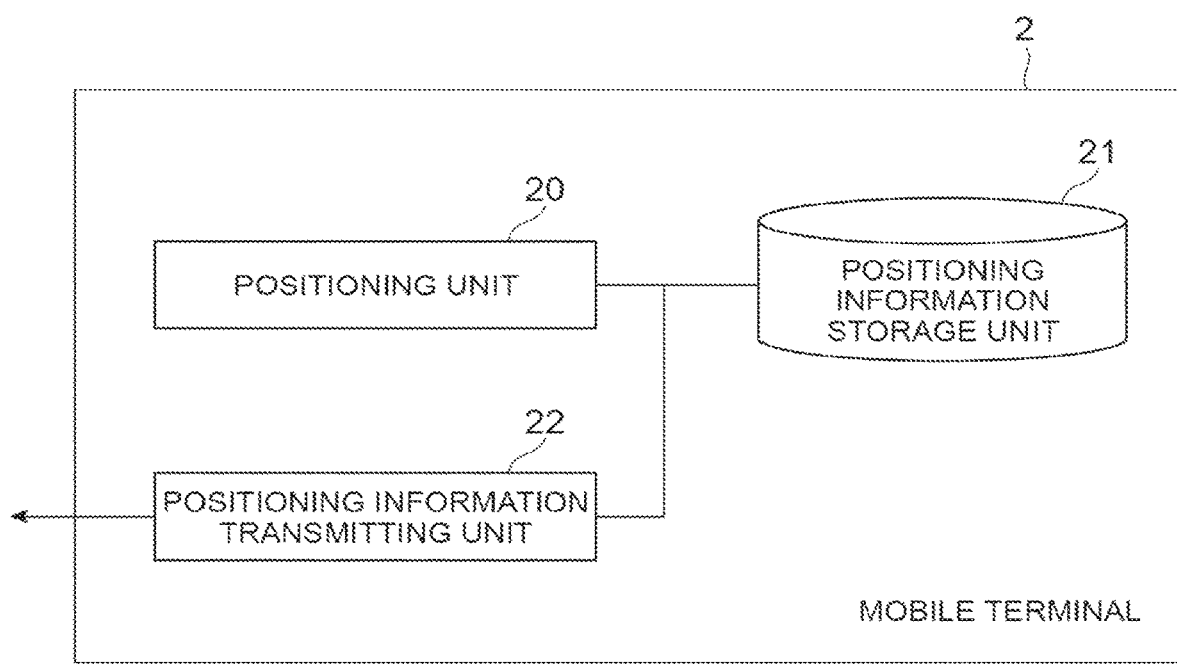
FIG. 2 is a diagram illustrating an example of a functional configuration of a mobile terminal according to the embodiment.

FIG. 2 is a diagram illustrating an example of a functional configuration of the mobile terminal 2 according to the embodiment. As illustrated in FIG. 2, the mobile terminal 2 includes a positioning unit 20, a positioning information storage unit 21, and a positioning information transmitting unit 22.

The positioning unit 20 acquires current position data of the mobile terminal 2 and a positioning timing which is a timing at which positioning has been performed by first positioning, and stores position information including the acquired position data and the acquired positioning timing (high-precision position information) in the positioning information storage unit 21. More specifically, the mobile terminal 2 includes a Global Positioning System (GPS) unit and performs first positioning using the GPS (GPS positioning). The mobile terminal 2 acquires position data including current latitude and longitude of the mobile terminal 2 and a positioning timing at which the GPS positioning has been performed through the GPS positioning. An example of a condition of the first positioning is sufficient precision of about 7 m (required for estimating pedestrian traffic). The positioning unit 20 may add at least one of a user identifier (which has been set in the mobile terminal 2 in advance) for identifying a user of the mobile terminal 2 which is a host terminal and a terminal identifier (which has been set in the mobile terminal 2 in advance) which is identification information of the mobile terminal 2 which is a host terminal to the position information. In this embodiment, the user identifier is used, but the user identifier may be appropriately replaced with a terminal identifier. The positioning unit 20 may add positioning information on positioning to the position information. The positioning information includes, for example, a positioning interval and a positioning error. The positioning unit 20 may add a moving speed of the mobile terminal 2 at the time of positioning (which is calculated by an acceleration sensor or the like of the mobile terminal 2) to the position information.

The positioning unit 20 may acquire the position information by performing the first positioning at a positioning interval defined in the specifications of a predetermined application installed in advance in the mobile terminal 2, may acquire the position information by performing the first positioning periodically (for example, once per minute), or may acquire the position information by performing the first positioning at a timing based on an instruction from a user or the like. In general, position data with high precision (higher in precision than a predetermined reference or that of other positioning) can be acquired by GPS positioning. The mobile terminal 2 may acquire the position information based on base station information of the base station 3, WiFi (registered trademark), a beacon, or the like without using GPS positioning.

By second positioning, the positioning unit 20 acquires a serving timing (an acquisition timing) which is a timing at which the mobile terminal is served (or positioned) and a base station ID (acquired based on radio waves from the base station 3) for identifying the base station 3 when the mobile terminal 2 is served in a radio communication range of the base station 3 at the time of performing the second positioning, and stores base station positioning information including the acquired serving timing and the acquired base station ID in the positioning information storage unit 21. The second positioning is, for example, base station positioning of the related art. The base station positioning is a method of calculating a rough position of the mobile terminal 2 using position information of the base station 3 in which the mobile terminal 2 is served. The positioning unit 20 may add at least one of a user identifier (which has been set in the mobile terminal 2 in advance) for identifying a user of the mobile terminal 2 which is a host terminal and a terminal identifier (which has been set in the mobile terminal 2 in advance) which is identification information of the mobile terminal 2 which is a host terminal to the base station positioning information. In this embodiment, a user identifier is used, and a user identifier may be appropriately replaced with a terminal identifier.

The positioning unit 20 may acquire the base station positioning information by performing second positioning periodically (for example, once per minute) or may acquire the base station positioning information by performing second positioning at a timing based on an instruction from a user or the like. The mobile terminal 2 may acquire the base station positioning information based on base station information of the base station 3, WiFi (registered trademark), a beacon, or the like without using base station positioning.

The positioning information storage unit 21 stores the position information and the base station positioning information.

The positioning information transmitting unit 22 transmits the position information and the base station positioning information to another device. More specifically, the positioning information transmitting unit 22 transmits the position information and the base station positioning information stored in the positioning information storage unit 21 or the position information and the base station positioning information generated by the positioning unit 20 to the environment estimation device 1 via the base station 3 and the network 4. The positioning information transmitting unit 22 may transmit the position information and the base station positioning information at time intervals defined in the specifications of the application, may transmit the position information and the base station positioning information periodically (for example, once every 10 minutes), or may transmit the position information and the base station positioning information at a timing based on an instruction from a user or the like. The positioning information transmitting unit 22 may transmit the position information and the base station positioning information at different timings.

Referring back to FIG. 1, the base station 3 is a device such as a radio station that performs radio communication with the mobile terminal 2. As described above, in this embodiment, the base station 3 is supposed to be a general base station in a mobile communication system, but the present disclosure is not limited thereto. The base station 3 transmits radio signals using an antenna or the like and forms a radio communication (geometric) range (for example, a cell range) of the base station 3. When the mobile terminal 2 is served in the radio communication range formed by the base station 3, the mobile terminal 2 performs radio communication with the base station 3 and performs communication (mobile communication) with the Internet or another mobile terminal 2 via the network 4. It is assumed that the base station 3 includes devices and functions of a general base station.

The network 4 is a network such as a mobile communication network. The environment estimation device 1 and (one or more) base stations 3 are communicatively connected to the network 4 in a wired manner or the like. The environment estimation device 1 and the mobile terminal 2 are communicatively connected to each other via the base station 3 and the network 4 and can transmit and receive information to and from each other.

Figure 3:
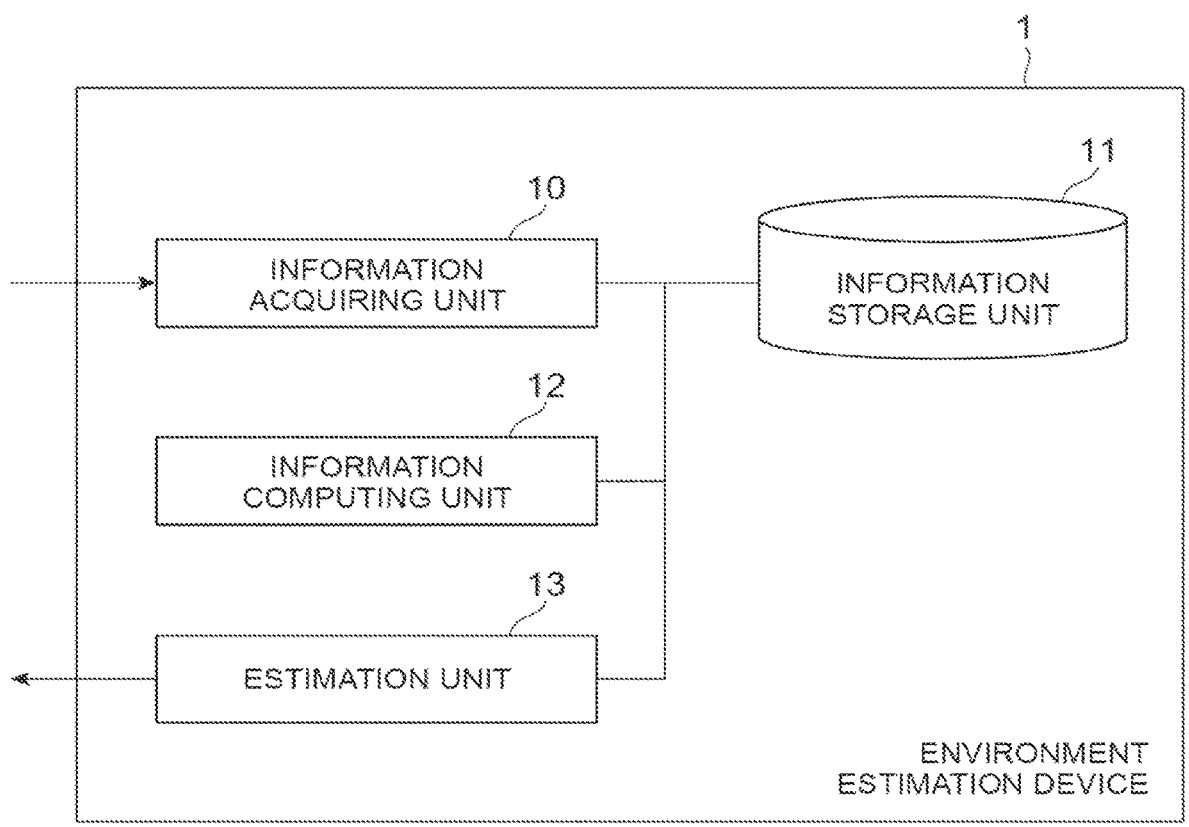
FIG. 3 is a diagram illustrating an example of a functional configuration of the environment estimation device according to the embodiment.

FIG. 3 is a diagram illustrating an example of a functional configuration of the environment estimation device 1 according to the embodiment. As illustrated in FIG. 3, the environment estimation device 1 includes an information acquiring unit 10 (an acquisition unit), an information storage unit 11 (a storage unit), an information computing unit 12, and an estimation unit 13 (an estimation unit).

It is assumed that the functional blocks of the environment estimation device 1 operate in the environment estimation device 1, but the present disclosure is not limited thereto. For example, some functional blocks of the environment estimation device 1 may serve to appropriately transmit and receive information to and from the environment estimation device 1 in a computer device which is different from the environment estimation device 1 and which is connected to the environment estimation device 1 via the network. Some functional blocks of the environment estimation device 1 may be omitted, two or more functional blocks may be incorporated into a single functional block, or a single functional block may be divided into two or more functional blocks.

The functions of the environment estimation device 1 illustrated in FIG. 3 will be described below.

The information acquiring unit 10 acquires arbitrary information. More specifically, the information acquiring unit 10 acquires arbitrary information from another device connected thereto via a network or acquires arbitrary information stored in the information storage unit 11. The information acquiring unit 10 outputs the acquired information to the functions of the environment estimation device 1.

The information acquiring unit 10 acquires (receives) position information and base station positioning information transmitted by the positioning information transmitting unit 22 of the mobile terminal 2. It is assumed that processes based on the position information and the base station positioning information in the environment estimation device 1 after the position information and the base station positioning information have been acquired by the information acquiring unit 10 are performed for each user indicated by a user identifier included in position information and the base station positioning information (performing subsequent processes for each user will not be repeatedly described).

The information acquiring unit 10 may acquire position information in which a position indicated by position data is included in a designated area in the position information. The information acquiring unit 10 may acquire position information in which a position indicated by position data is included in a designated area in position information of mobile terminals 2 carried by a plurality of users.

Figure 4:
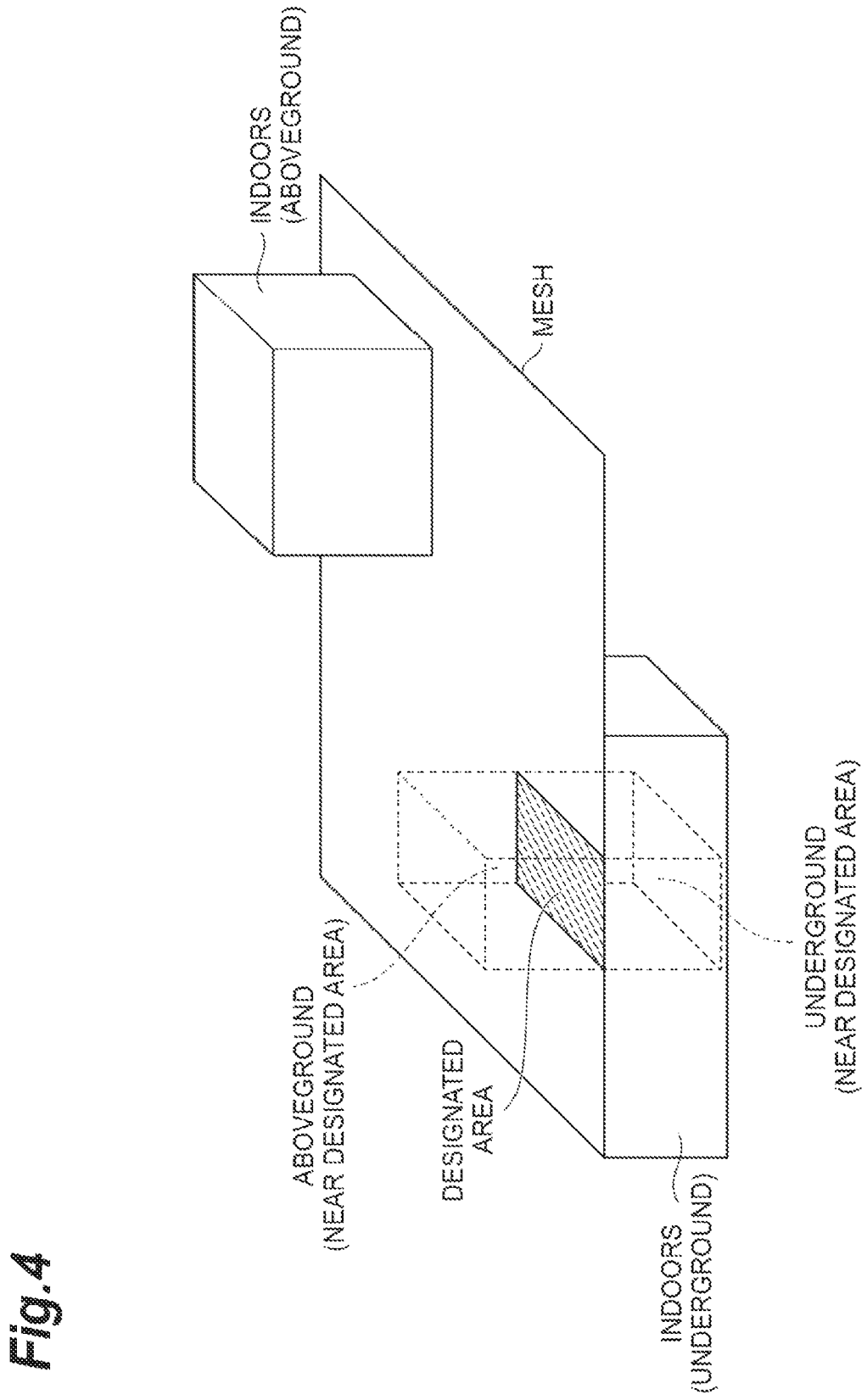
FIG. 4 is a diagram illustrating an example of a designated area.

The designated area is, for example, a geometric two-dimensional area. The designated area may be designated by a manager of the environment estimation device 1 in advance or may be designated based on designated area information on the designated area received by another device. FIG. 4 is a diagram illustrating an example of a designated area. In FIG. 4, a designated area is located in a part of meshes which are areas (for example, a square area with one side of 125 m) which are divided based on predetermined geometric regulations. An upper part in the vertical direction in the designated area is an aboveground part of the designated area, and a lower part in the vertical direction in the designated area is an underground part of the designated area. A space of a subway or an underground shopping area is in the lower part (the underground part) in the vertical direction in some area of the mesh, and the space is classified as an (underground) indoor part. The underground part of the designated area is included in the space. A building is in the upper part (the aboveground part) in the vertical direction in some area of the mesh, and a space of the building is classified as an (aboveground) indoor part. The designated area may be an area without an above ground building (as illustrated in FIG. 4). Accordingly, the indoor part in an above ground building is separated (excluded), and it is possible to uniquely determine that it is an underground part when environment information indicates an indoor part and that it is an above ground part when the environment information indicates an outdoor part.

The information storage unit 11 stores arbitrary information. More specifically, the information storage unit 11 stores information acquired by the information acquiring unit 10 or appropriately stores information calculated by the functions of the environment estimation device 1. For example, the information storage unit 11 stores position information and base station positioning information acquired by the information acquiring unit 10. The information stored in the information storage unit 11 is appropriately referred to by the functions of the environment estimation device 1.

FIG. 5 is a diagram illustrating a table example of position information stored in the information storage unit 11. As illustrated in FIG. 5, in the position information, a user identifier for identifying a user of a mobile terminal 2, a positioning timing at which the mobile terminal 2 carried by the user has performed positioning, the latitude acquired by the positioning (a part of position data), and the longitude acquired by the positioning (a part of position data) are correlated.

FIG. 6 is a diagram illustrating a table example of base station positioning information which is a part of base station information which will be described later and which is stored in the information storage unit 11. As illustrated in FIG. 6, in the base station positioning information, a user identifier for identifying a user of a mobile terminal 2, a serving timing at which the user is served, and a base station ID of a base station 3 forming a radio communication range in which the user is served are correlated. The user identifier in the base station positioning information and the user identifier in the position information are mutually unique.

The information storage unit 11 stores base station data in advance. FIG. 7 is a diagram illustrating a table example of base station data which is a part of base station information which will be described later. As illustrated in FIG. 7, in the base station data, a base station ID of a base station and environment information (indoor/outdoor determination information, an indoor/outdoor flag) indicating whether the base station is present indoors or outdoors (indicating an environment of the base station) are correlated.

The information storage unit 11 may store base station information (radio equipment information) in which the base station positioning information and the base station data are combined. More specifically, the information storage unit 11 stores a table example in which the table example illustrated in FIG. 6 and the table example illustrated in FIG. 7 are combined (are joined based on the base station ID) as a table example of the base station information. For example, it can be seen from the table examples illustrated in FIGS. 6 and 7 that a mobile terminal 2 carried by a user with a user identifier "0" is served in a radio communication range of a base station 3 with a base station ID "590" at a serving timing "11:21" and the base station 3 is present "indoors."

The information computing unit 12 computes arbitrary information. More specifically, the information computing unit 12 computes arbitrary information acquired by the information acquiring unit 10 or computes arbitrary information stored in the information storage unit 11. The information computing unit 12 may store the computed information in the information storage unit 11. For example, the information computing unit 12 may compute (generate) the base station information based on the base station positioning information and the base station data stored in the information storage unit 11 and store the computed base station information in the information storage unit 11. The information computing unit 12 may compute information periodically, may compute information at a timing based on an instruction from a user or the like, or may compute information at a timing based on an instruction from another function of the environment estimation device 1.

The estimation unit 13 estimates an environment of a mobile terminal 2 at a position indicated by position data included in position information based on a positioning timing included in the position information of the mobile terminal 2 acquired by the information acquiring unit 10 (or stored in the information storage unit 11) and the base station information stored in the information storage unit 11. More specifically, the estimation unit 13 estimates an environment of a mobile terminal 2 based on an environment indicated by environment information correlated with the base station information at the serving timing correlated with the positioning timing included in the position information of the mobile terminal 2. For example, the estimation unit 13 may estimate the environment indicated by the environment information correlated with the base station information at the same serving timing as the positioning timing included in the position information of the mobile terminal 2 as the environment of the mobile terminal 2. A specific estimation method will be described below with reference to FIGS. 8 and 9.

Figure 8:
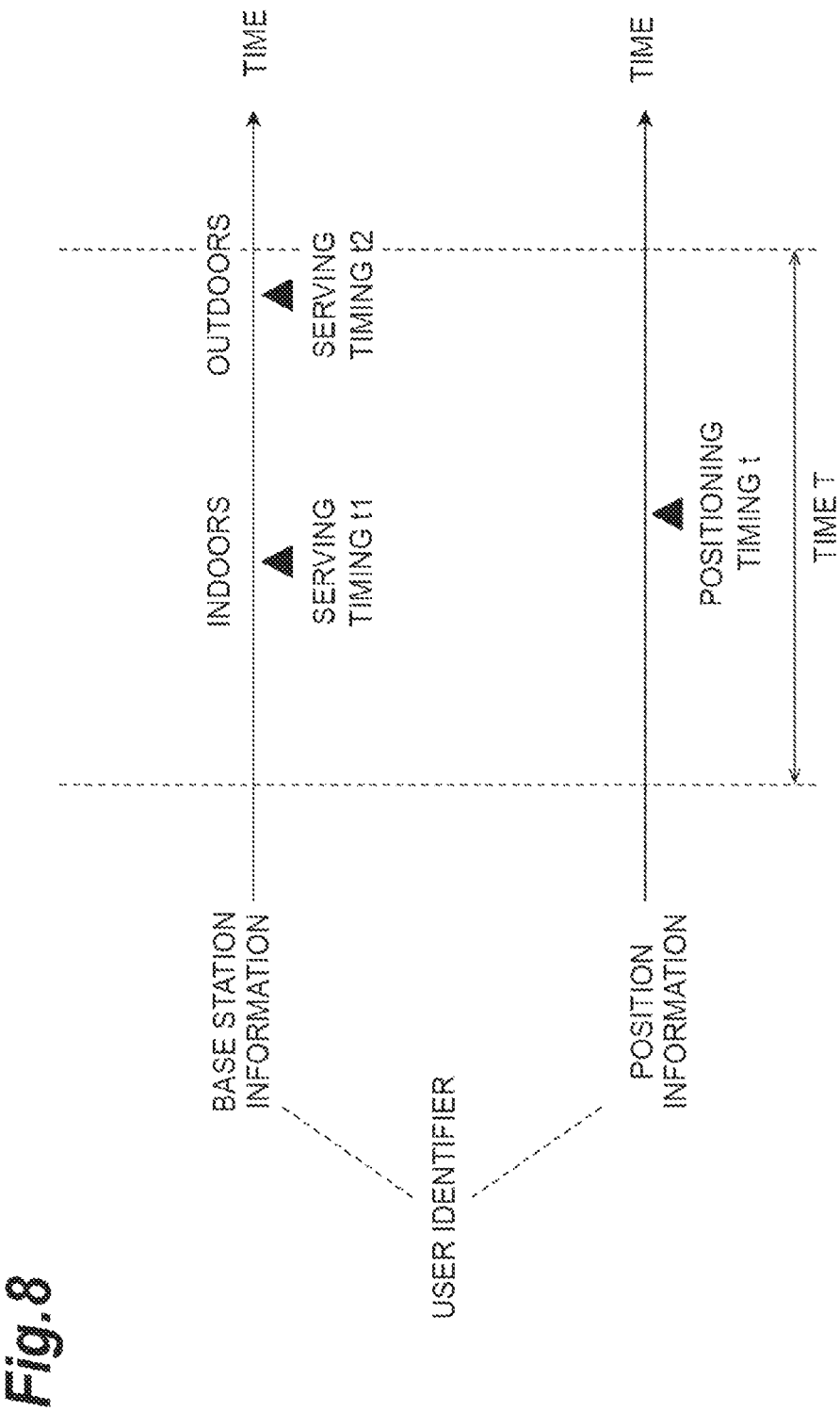
FIG. 8 is a diagram illustrating an example of an estimation method using base station information and position information.

FIG. 8 is a diagram illustrating an example of an estimation method using base station information and position information. In FIG. 8, a serving timing t1 and a serving timing t2 which are examples of a serving timing at which the base station information has been acquired by positioning and a positioning timing t which is an example of a positioning timing at which position information has been acquired by positioning are arranged along the time axis. The environment indicated by the environment information correlated with the base station information at the serving timing t1 is "being indoors," and the environment indicated by the environment information correlated with the base station information at the serving timing t2 is "being outdoors." As described above, the base station information and the position information are correlated using a user identifier. A range of a predetermined time T including the positioning timing t is represented on the time axis. For example, the time T may be set to a range from "t−T/2" to "t+T/2" on the time axis.

Figure 9:
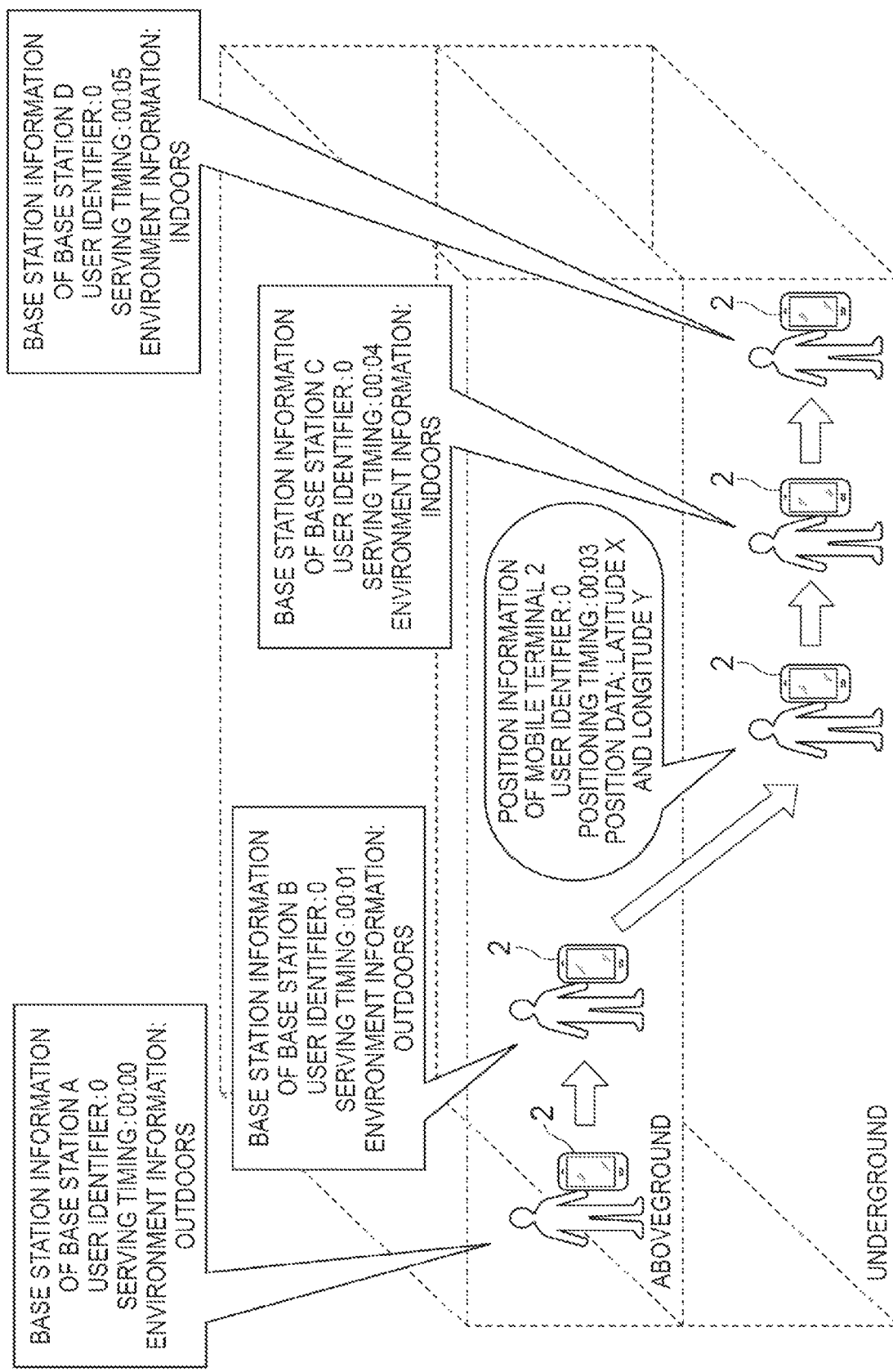
FIG. 9 is a diagram illustrating another example of an estimation method using base station information and position information.

FIG. 9 is a diagram illustrating another example of an estimation method using base station information and position information. FIG. 9 illustrates movement of a user (with a user identifier "0") carrying a mobile terminal 2 overground or underground in a time series (from time 00:00 to time 00:05). At time 00:00, serving of the mobile terminal 2 is ascertained when a base station A (being present outdoors) which is one base station has been acquired by positioning 3, and base station information including a serving timing "00:00" and environment information "outdoors" is generated and transmitted to the environment estimation device 1. Then, at time 00:01, serving of the mobile terminal 2 is ascertained when a base station B (being present outdoors) which is one base station 3 has been acquired by positioning, and base station information including a serving timing "00:01" and environment information "outdoors" is generated and transmitted to the environment estimation device 1. Then, at time 00:03, position information including a positioning timing "00:03" and position data "latitude X and longitude Y" is generated and transmitted to the environment estimation device 1 by the positioning unit 20 of the mobile terminal 2. Then, at time 00:04, serving of the mobile terminal 2 is ascertained when a base station C (being present indoors) which is one base station 3 has been acquired by positioning, and base station information including a serving timing "00:04" and environment information "indoors" is generated and transmitted to the environment estimation device 1. Then, at time 00:05, serving of the mobile terminal 2 is ascertained when a base station D (being present indoors) which is one base station 3 has been acquired by positioning, and base station information including a serving timing "00:05" and environment information "indoors" is generated and is transmitted to the environment estimation device 1.

[Estimation Method 1]

The estimation unit 13 may estimate an environment based on an environment correlated with base station information at a serving timing (temporally) closest to a positioning timing in the base station information.

In the example illustrated in FIG. 8, the estimation unit 13 estimates an environment based on the environment "indoors" correlated with the base station information at the serving timing t1 closest to the positioning timing t.

In the example illustrated in FIG. 9, the estimation unit 13 estimates an environment based on the environment "indoors" correlated with the base station information of the base station C at the serving timing "00:04" closest to the positioning timing "00:03." The estimation unit 13 may estimate the environment of the mobile terminal 2 as "aboveground presence proportion: 0" based on the environment "indoors."

[Estimation Method 2]

The estimation unit 13 may estimate an environment based on an environment correlated with base station information at a serving timing included in a predetermined time including a positioning timing in the base station information. The estimation unit 13 may estimate an environment based on a (occurrence) proportion of an environment correlated with the base station information at the serving timing included in the predetermined time including the positioning timing in the base station information.

In the example illustrated in FIG. 8, the estimation unit 13 estimates an environment based on the environments "indoors" and "outdoors" correlated with the base station information at the serving timing t1 and the serving timing t2 included in the time T including the positioning timing t or estimates an environment based on 1:1 which is a ratio between the environments "indoors" and "outdoors." For example, the estimation unit 13 may estimate an environment of the mobile terminal 2 as "aboveground presence proportion: 50% (0.5)" based on 1:1 which is a ratio between the environments "indoors" and "outdoors."

In the example illustrated in FIG. 9, the estimation unit 13 may estimate an environment based on the environment "outdoors" correlated with the base station information of the base station B at the serving timing "00:01," the environment "indoors" correlated with the base station information of the base station C at the serving timing "00:04," and the environment "indoors" correlated with the base station information of the base station D at the serving timing "00:05" which are included in a predetermined time (two minutes herein) including the positioning timing "00:03" or may estimate an environment of the mobile terminal 2 as "aboveground presence proportion: 33% (0.33)" based on 1:2 which is a ratio between the environments "indoors" and "outdoors" based on the environments "indoors," "outdoors," and "indoors" (based on an expression "1/(1+2)").

[Estimation Method 3]

The estimation unit 13 may estimate an environment additionally based on a difference between a serving timing and a positioning timing in Estimation Method 1 or Estimation method 2. For example, as the difference between a serving timing and a positioning timing decreases, a weight of an environment correlated with the base station information at the serving timing may be increased. For example, as the difference between a serving timing and a positioning timing increases, the weight of the environment correlated with the base station information at the serving timing may be decreased.

For example, in the example illustrated in FIG. 9 illustrating Estimation Method 2, the estimation unit 13 may estimate the weight based on two minutes which is the difference between the serving timing and the positioning timing as "0.2" for the environment "outdoors" correlated with the base station information of the base station B at the serving timing "00:01," estimate the weight based on one minute which is the difference between the serving timing and the positioning timing as "0.5" for the environment "indoors" correlated with the base station information of the base station C at the serving timing "00:04," estimate the weight based on two minutes which is the difference between the serving timing and the positioning timing as "0.2" for the environment "indoors" correlated with the base station information of the base station D at the serving timing "00:05," and estimate the environment of the mobile terminal 2 as "aboveground presence proportion: 22% (0.22)" based on the total weight "0.2" of the environment "outdoors" and the total weight "0.7" of the environment "indoors" (based on an expression "0.2/(0.2+0.7)").

Estimation Methods 1 to 3 have been described hitherto.

The estimation unit 13 may estimate an environment of a mobile terminal 2 in a designated area based on the estimated environments of the mobile terminal 2 at the positions. For example, the estimation unit 13 may estimate an environment which is a majority out of the environments of the mobile terminals 2 estimated based on position information included in the designated area as the environment of the mobile terminal 2 in the designated area. For example, the estimation unit 13 may estimate the environment of the mobile terminal 2 in the designated area based on a proportion of each of the environments of the mobile terminals 2 estimated based on position information included in the designated area.

The estimation unit 13 may further estimate an environment of a mobile terminal 2 in the designated area based on the estimated environments of mobile terminals 2 of users in the designated area. For example, the estimation unit 13 estimates "0.36" which is an average of aboveground presence proportions of three users as an aboveground presence proportion of a mobile terminal 2 in the designated area when the aboveground presence proportion of a user identifier "A" in the designated area is estimated as "0.0," the aboveground presence proportion of a user identifier "B" is estimated as "0.9," and the aboveground presence proportion of a user identifier "C" is estimated as "0.2."

The estimation unit 13 may calculate and output a user proportion for each environment in the designated area based on an estimated environment of each mobile terminal 2 (of a plurality of mobile terminals 2) at each position (of a plurality of positions). For example, the estimation unit 13 may calculate a user proportion between "indoors" and "outdoors" as 1:3 and output the calculated user proportion.

The estimation unit 13 may output an estimation result. More specifically, the estimation result may be output (transmitted) to another device connected via a network or may be output (displayed) to a user of the environment estimation device 1 via an output device 1006 which will be described later.

An example of a process routine (an environment estimation method) which is performed by the environment estimation system 5 will be described below with reference to the flowcharts illustrated in FIGS. 10 and 11.

Figure 10:
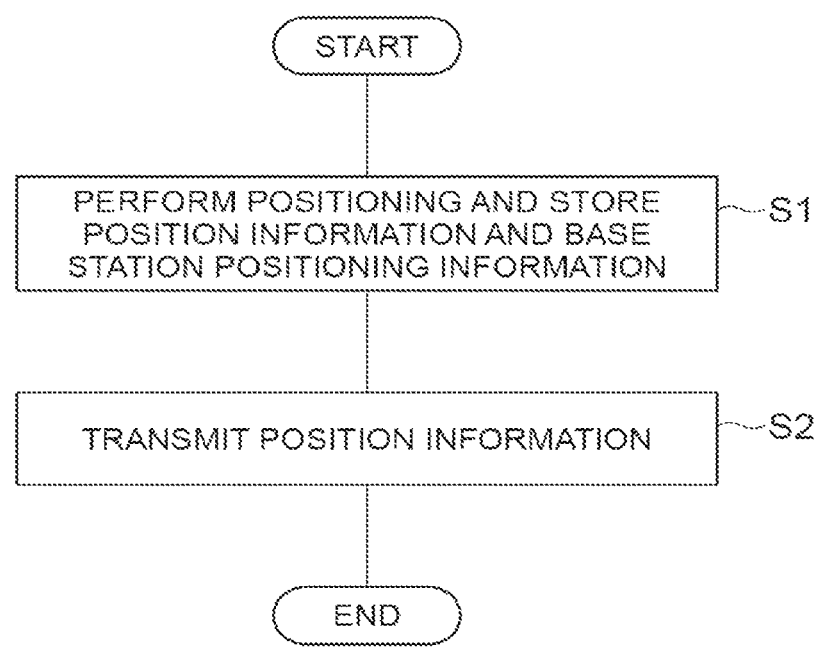
FIG. 10 is a flowchart illustrating an example of a positioning process which is performed by the mobile terminal according to the embodiment.

FIG. 10 is a flowchart illustrating an example of a positioning process which is performed by a mobile terminal 2. First, the positioning unit 20 acquires position information including position data and positioning information and base station positioning information including a serving timing and a base station ID by positioning, and stores the acquired position information and the acquired base station positioning information in the positioning information storage unit 21 (Step S1). Then, the positioning information transmitting unit 22 transmits the position information and the base station positioning information acquired in Step S1 or the position information and the base station positioning information stored in Step S1 to the environment estimation device 1 via the base station 3 and the network 4 (Step S2). Step S1 may be repeatedly performed two or more times before Step S2 is performed. After Step S2 has been performed, the process routine may return to Step S1 and the processes of Steps S1 and S2 may be repeatedly performed. The position information may not be stored in Step S1 and the position information acquired in Step S1 may be transmitted directly in Step S2 (without storing the position information in the positioning information storage unit 21). The position information and the base station positioning information may be measured, stored, and transmitted at different timings.

Figure 11:
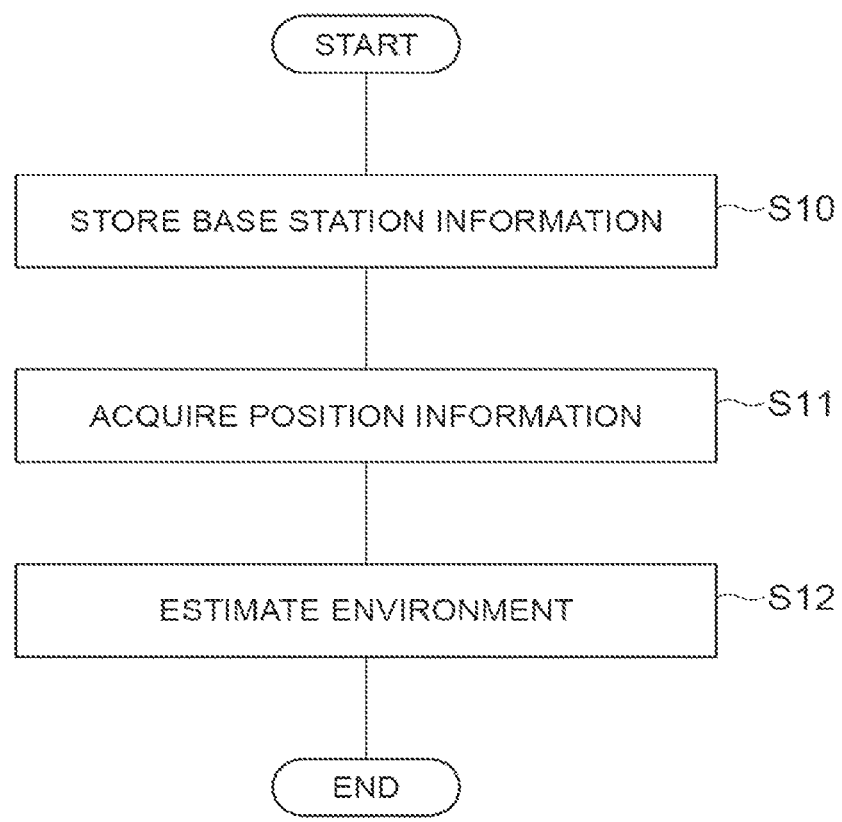
FIG. 11 is a flowchart illustrating an example of an environment estimating process which is performed by the environment estimation device according to the embodiment.

FIG. 11 is a flowchart illustrating an example of an environment estimating process which is performed by the environment estimation device 1. First, the information storage unit 11 stores base station information (Step S10). The base station information is computed by the information computing unit 12, for example, based on the base station positioning information transmitted from a mobile terminal 2 and acquired by the information acquiring unit 10 and the base station data stored in advance in the information storage unit 11. Then, the information acquiring unit 10 acquires position information transmitted from the mobile terminal 2 (Step S11). Then, the estimation unit 13 estimates an environment of the mobile terminal 2 based on a positioning timing included in the position information acquired in Step S11 and the base station information stored in Step S10 (Step S12). The order of Steps S10 and S11 may be inverted.

Operations and advantages of the environment estimation device 1 according to the embodiment will be described below.

The environment estimation device 1 has a configuration including the information storage unit 11 configured to stores base station information in which a serving timing at which a mobile terminal 2 is served in a radio communication range of a base station 3 and environment information indicating an environment of the base station 3 are correlated, the information acquiring unit 10 configured to acquire position information including position data of the mobile terminal 2 acquired by positioning and a positioning timing, and the estimation unit 13 configured to estimate, based on the positioning timing included in the position information of the mobile terminal 2 acquired by the information acquiring unit 10 and the base station information stored in the information storage unit 11, an environment of the mobile terminal 2 at a position indicated by the position data included in the position information. With this configuration, the environment of the mobile terminal 2 at the position indicated by the position data included in the position information is estimated based on the positioning timing included in the acquired position information of the mobile terminal 2 and the stored base station information. That is, it is possible to more easily estimate the environment of the mobile terminal 2 based on the position information and the base station information.

In the environment estimation device 1, the environment may include at least one of being present indoors or being present outdoors. With this configuration, for example, it is possible to estimate whether the mobile terminal 2 is present indoors (underground) or outdoors (overground).

In the environment estimation device 1, the estimation unit 13 may estimate the environment of the mobile terminal based on an environment correlated with the base station information at a serving timing closest to the positioning timing in the base station information. With this configuration, since the environment of the mobile terminal is estimated based on the environment correlated with the base station information which is temporally closer, that is, the environment correlated with the base station information which is geometrically closer, it is possible to perform the estimation with higher accuracy.

In the environment estimation device 1, the estimation unit 13 may estimate the environment of the mobile terminal based on the environment correlated with the base station information at the serving timing which is included in a predetermined time including the positioning timing in the base station information. With this configuration, since the environment of the mobile terminal is estimated based on the environment correlated with the base station information of (one or more) base stations which are geometrically close, it is possible to perform the estimation with higher accuracy.

In the environment estimation device 1, the estimation unit 13 may estimate the environment of the mobile terminal based on proportions of environments correlated with each of the base station information at the serving timing which is included in the predetermined time including the positioning timing in the base station information. With this configuration, since the environment of the mobile terminal is estimated based on the proportions of a plurality of environments correlated with the base station information of a plurality of base stations which are geometrically close, it is possible to perform the estimation with higher accuracy.

In the environment estimation device 1, the estimation unit 13 may estimate the environment of the mobile terminal additionally based on a difference between the serving timing and the positioning timing. With this configuration, since weighting can be performed, for example, based on temporal closeness, that is, geometrical closeness (between the mobile terminal 2 and the base station 3), it is possible to perform the estimation with higher accuracy.

In the environment estimation device 1, the information acquiring unit 10 may acquire position information in which a position indicated by position data is included in a designated area in position information, and the estimation unit 13 may estimate the environment of the mobile terminal 2 in the designated area based on estimated environments of the mobile terminal 2 at each of positions. With this configuration, it is possible to more easily estimate the environment of the mobile terminal 2 in a designated area instead of a position.

In the environment estimation device 1, the information acquiring unit 10 may acquire position information in which a position indicated by position data is included in a designated area in position information of mobile terminals 2 which are carried by each of a plurality of users, and the estimation unit 13 may calculate a user proportion for each environment in the designated area based on the estimated environments of each of mobile terminals 2 at each of positions and output the user proportion. With this configuration, since a user proportion for each environment in the designated area can be calculated and output based on the position information of a plurality of users, it is possible to obtain more useful information.

In the environment estimation device 1, the designated area may be an area without an aboveground building. With this configuration, an indoor part in an aboveground building is separated (excluded), and it is possible to uniquely determine that it is an underground part when the environment information indicates an indoor part and that it is an aboveground part when the environment information indicates an outdoor part.

In the related art, in an area including an underground shopping area and a subway (such as stations and railways), there is a problem in that an error may occur in a measurement result of aboveground population or traffic and accurate population or traffic may not be able to be calculated. That is, in a designated area, there is a problem in that population or traffic between aboveground and underground cannot be separately estimated. There is another problem in that it is difficult to estimate population or traffic in a heavily populated area (overlapping of pedestrians) or in a wide area (remote pedestrians) and it is difficult to exclude pedestrians in an underground shopping area and a subway (it is not possible to secure accuracy). With the environment estimation device 1 according to this embodiment, high-precision position information (position information) and indoor/outdoor determination information (base station information) are correlated, a population proportion or a pedestrian proportion between aboveground and underground is calculated, and population or traffic is separately estimated. That is, aboveground/underground determination at the time of acquiring high-precision position information is performed (estimation is performed based on indoor/outdoor series data (environment information) before and after positioning). With the environment estimation device 1, it is possible to estimate population or traffic of unique users in an arbitrary designated area with high precision. With the environment estimation device 1, it is possible to estimate population or traffic in a heavily populated area or an area including remote pedestrians. With the environment estimation device 1, it is possible to estimate aboveground population or aboveground traffic with high precision using high-precision positioning results (position information) and indoor/outdoor determination information (base station information).

With the environment estimation device 1, it is possible to calculate an aboveground proportion in an arbitrary area by correlating GPS data with base station information including indoor/outdoor information using a user identifier and a positioning timing. With the environment estimation device 1, it is possible to calculate an aboveground population proportion in an arbitrary area using high-precision position information and indoor/outdoor determination information. With the environment estimation device 1, an environment of a mobile terminal is estimated based on indoor/outdoor determination information acquired at a timing closest to the positioning timing. With the environment estimation device 1, an environment of a mobile terminal is estimated based on an aboveground presence proportion of users calculated from the number of pieces of indoor/outdoor determination information. With the environment estimation device 1, an environment of a mobile terminal is estimated based on an aboveground (underground) presence proportion of users calculated from the number of pieces of indoor/outdoor determination information and weights in an arbitrary probability distribution. With the environment estimation device 1, an aboveground population proportion and an underground population proportion are calculated by setting a target area for population proportion calculation to a defined area from which an aboveground building is excluded.

The aboveground proportion calculating method which is performed by the environment estimation device 1 may be as follows:

(1) Positioning information of a closest base station is acquired from radio waves which are being received by a mobile terminal 2;

(2) An area information file of an audiovisual defined area which has been prepared in advance is input and stored in a memory (which is required when it is intended to calculate an underground population proportion of the stored audiovisual defined area to be estimated);

(3) Positioning data belonging to an arbitrary area to be estimated is extracted;

(4) A difference between positioning data of unique users and a serving timing in base station information is calculated;

(5) All pieces of base station information in which a difference between the positioning data and the serving timing is equal to or less than a threshold value are correlated;

(6-1) Indoor/outdoor determination in which the difference between the positioning data and the serving timing of the base station information is the smallest is employed;

(6-2) An aboveground presence proportion is calculated from the number of pieces of base station information correlated with the positioning data;

(6-3) An aboveground presence proportion is calculated from the number of pieces of base station information correlated with the positioning data and a probability distribution which is defined in advance;

(One of (6-1) to (6-3) is used)

(7) The aboveground presence proportion for each sub mesh is collected and is set as an aboveground presence proportion of a mesh.

The environment estimation device 1 can be applied to various fields. For example, the environment estimation device 1 can be applied to estimation of the number of viewers of an outdoor advertisement such as Distal Out Of Home (DOOH). Accordingly, an advertisement frame can be sold based on the number of advertisement viewers (impressions), attributes, and the like. More specifically, the environment estimation device 1 can exclude underground users included in traffic of a DOOH viewing area. For example, by multiplying an estimated traffic value of the DOOH viewing area (including aboveground and underground) calculated in advance using existing techniques by an aboveground user proportion of the DOOH viewing areas calculated by the environment estimation device 1, it is possible to calculate an estimated aboveground traffic value of the DOOH viewing area.

The block diagrams used to describe the aforementioned embodiment are functional blocks. These functional blocks (constituents) are realized by an arbitrary combination of at least one of hardware and software. The realization method of each functional block is not particularly limited. That is, each functional block may be realized by a single device which is physically or logically coupled, or may be realized by two or more devices which are physically or logically separated and which are directly or indirectly connected (for example, in a wired or wireless manner). Each functional block may be realized by combining software with the single device or the two or more devices.

The functions include determining, deciding, judging, calculating, computing, processing, deriving, investigating, searching, ascertaining, receiving, transmitting, outputting, accessing, resolving, selecting, choosing, establishing, comparing, supposing, expecting, considering, broadcasting, notifying, communicating, forwarding, configuring, reconfiguring, allocating or mapping, and assigning, but are not limited thereto. For example, a functional block (constituent) for transmitting is referred to as a transmitting unit or a transmitter. As described above, the realizing method of each function is not particularly limited.

Figure 12:
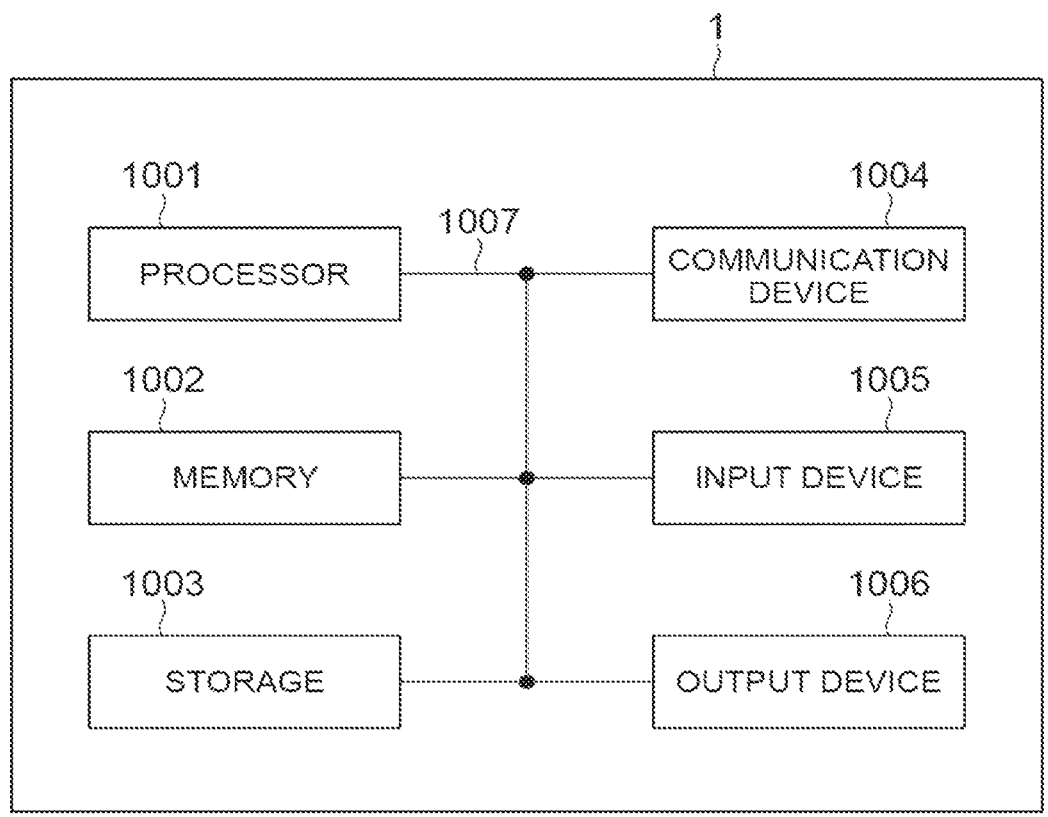
FIG. 12 is a diagram illustrating an example of a hardware configuration of a computer which is used for the environment estimation device according to the embodiment.

For example, the environment estimation device 1 according to an embodiment of the present disclosure may serve as a computer that performs the process steps of a data correcting method according to the present disclosure. FIG. 12 is a diagram illustrating an example of a hardware configuration of the environment estimation device 1 according to an embodiment of the present disclosure. The environment estimation device 1 may be physically configured as a computer device including a processor 1001, a memory 1002, a storage 1003, a communication device 1004, an input device 1005, an output device 1006, and a bus 1007.

In the following description, the term "device" can be replaced with circuit, device, unit, or the like. The hardware configuration of the environment estimation device 1 may be configured to include one or more devices illustrated in the drawing or may be configured to exclude some devices thereof.

The functions of the environment estimation device 1 can be realized by reading predetermined software (program) to hardware such as the processor 1001 and the memory 1002 and causing the processor 1001 to execute arithmetic operations and to control communication using the communication device 1004 or to control at least one of reading and writing of data with respect to the memory 1002 and the storage 1003.

The processor 1001 controls a computer as a whole, for example, by causing an operating system to operate. The processor 1001 may be configured as a central processing unit (CPU) including an interface with peripherals, a controller, an arithmetic operation unit, and a register. For example, the information acquiring unit 10, the information computing unit 12, and the estimation unit 13 may be realized by the processor 1001.

The processor 1001 reads a program (a program code), a software module, data, or the like from at least one of the storage 1003 and the communication device 1004 to the memory 1002 and performs various processes in accordance therewith. As the program, a program that causes a computer to perform at least some of the operations described in the above-mentioned embodiment is used. For example, the information acquiring unit 10, the information computing unit 12, and the estimation unit 13 may be realized by a control program which is stored in the memory 1002 and which operates in the processor 1001, and the other functional blocks may be realized in the same way. The various processes described above are described as being performed by a single processor 1001, but they may be simultaneously or sequentially performed by two or more processors 1001. The processor 1001 may be mounted as one or more chips. The program may be transmitted from a network via an electrical telecommunication line.

The memory 1002 is a computer-readable recording medium and may be constituted by, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store a program (a program code), a software module, and the like that can be executed to perform a radio communication method according to an embodiment of the present disclosure.

The storage 1003 is a computer-readable storage medium and may be constituted by, for example, at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be referred to as an auxiliary storage device. The storage media may be, for example, a database, a server, or another appropriate medium including at least one of the memory 1002 and the storage 1003.

The communication device 1004 is hardware (a transmitting and receiving device) that performs communication between computers via at least one of a wired network and a wireless network and is also referred to as, for example, a network device, a network controller, a network card, or a communication module. The communication device 1004 may include a radio-frequency switch, a duplexer, a filter, and a frequency synthesizer to realize at least one of frequency division duplex (FDD) and time division duplex (TDD). For example, the information acquiring unit 10 and the estimation unit 13 may be realized by the communication device 1004.

The input device 1005 is an input device that receives an input from the outside (for example, a keyboard, a mouse, a microphone, a switch, a button, or a sensor). The output device 1006 is an output device that performs an output to the outside (for example, a display, a speaker, or an LED lamp). The input device 1005 and the output device 1006 may be configured as a unified body (for example, a touch panel).

The devices such as the processor 1001 and the memory 1002 are connected to each other via the bus 1007 for transmission of information. The bus 1007 may be constituted by a single bus or may be constituted by buses which are different depending on the devices.

The environment estimation device 1 may be configured to include hardware such as a microprocessor, a digital signal processor (DSP), an application-specific integrated circuit (ASIC), a programmable logic device (PLD), or a field-programmable gate array (FPGA), and some or all of the functional blocks may be realized by the hardware. For example, the processor 1001 may be mounted as at least one piece of hardware.

Notifying of information is not limited to the aspects/embodiments described in the present disclosure, but may be performed using another method. For example, notifying of information may be performed using physical layer signaling (for example, downlink control information (DCI), uplink control information (UCI)), upper layer signaling (for example, radio resource control (RRC) signaling, medium access control (MAC) signaling, notification information (master information block (MIB), or system information block (SIB)), other signaling, or a combination thereof. RRC signaling may be referred to as an RRC message and may be, for example, an RRC connection setup message or an RRC connection reconfiguration message.

The aspects/embodiments described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX(registered trademark)), IEEE 802.20, UWB (Ultra-Wide Band), Bluetooth (registered trademark), or another appropriate system and a next-generation system which is extended based thereon. A plurality of systems may be combined (for example, at least one of LTE and LTE-A and 5G may be combined) as an application.

The order of the processing steps, the sequences, the flowcharts, and the like of the aspects/embodiments described above in the present disclosure may be changed unless conflictions arise. For example, in the methods described in the present disclosure, various steps are described as elements of the exemplary order, but the methods are not limited to the described order.

Specific operations which are described to be performed by a base station in the present disclosure may be performed by an upper node in some cases. In a network including one or more network nodes including a base station, it is obvious that various operations which are performed for communication with a terminal can be performed by at least one of a base station and a network node (for example, an MME or an S-GW can be considered, but the network node is not limited thereto) other than the base station. An example in which the number of network nodes other than a base station is one has been described above, but the network node may be a combination of a plurality of different network nodes (for example an MME and an S-GW).

Information or the like can be output from an upper layer (or a lower layer) to a lower layer (or an upper layer). Information or the like may be input and output via a plurality of network nodes.

Information or the like which is input or output may be stored in a specific place (for example, a memory) or may be managed using a management table. Information or the like which is input or output may be overwritten, updated, or added. Information or the like which is output may be deleted. Information or the like which is input may be transmitted to another device.

Determination may be performed using a value (0 or 1) which is expressed in one bit, may be performed using a Boolean value (true or false), or may be performed by comparison of numerical values (for example, comparison with a predetermined value).

The aspects/embodiments described in the present disclosure may be used alone, may be used in combination, or may be switched during implementation thereof. Notifying of predetermined information (for example, notifying that "it is X") is not limited to explicit notification, and may be performed by implicit notification (for example, notifying of the predetermined information is not performed).

While the present disclosure has been described above in detail, it will be apparent to those skilled in the art that the present disclosure is not limited to the embodiments described in the present disclosure. The present disclosure can be altered and modified in various forms without departing from the gist and scope of the present disclosure defined by description in the appended claims. Accordingly, the description in the present disclosure is for exemplary explanation and does not have any restrictive meaning for the present disclosure.

Regardless of whether it is called software, firmware, middleware, microcode, hardware description language, or another name, software can be widely construed to refer to a command, a command set, a code, a code segment, a program code, a program, a sub program, a software module, an application, a software application, a software package, a routine, a sub routine, an object, an executable file, an execution thread, a sequence, a function, or the like.

Software, a command, information, and the like may be transmitted and received via a transmission medium. For example, when software is transmitted from a web site, a server, or another remote source using at least one of wired technology (such as a coaxial cable, an optical fiber cable, a twisted-pair wire, or a digital subscriber line (DSL)) and wireless technology (such as infrared rays or microwaves), the at least one of wired technology and wireless technology is included in the definition of the transmission medium.

Information, signals, and the like described in the present disclosure may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

Terms described in the present disclosure and terms required for understanding the present disclosure may be substituted with terms having the same or similar meanings.

The terms "system" and "network" used in the present disclosure are compatibly used.

Information, parameters, and the like described above in the present disclosure may be expressed as absolute values, may be expressed as values relative to predetermined values, or may be expressed using other corresponding information. For example, radio resources may be indicated by indices.

Names used for the aforementioned parameters are not restrictive in any respect. Mathematical expressions or the like using the parameters may be different from those which are explicitly described in the present disclosure.

In the present disclosure, terms such as "base station (BS)," "radio base station," "fixed station," "NodeB," "eNodeB (eNB)," "gNodeB (gNB)," "access point," "transmission point," "reception point," "transmission/reception point," "cell," "sector," "cell group," "carrier," and "component carrier" are compatibly used. A base station may be referred to as a term such as macro cell, small cell, femtocell, or picocell.

A base station may include one or more (for example, three) cells. When a base station includes two or more cells, the whole coverage area of the base station may be divided into subareas of which the number is less than the two or more cells, and each subarea may provide a communication service, for example, a base-station substructure (for example, a remote radio head (RRH) for indoors). The term "cell" or "sector" refers to a part or whole of a coverage area of at least one of a base station and a base-station substructure that provide a communication service in the coverage.

In the present disclosure, terms such as "mobile station (MS)," "user terminal," "user equipment (UE)," and "terminal" can be compatibly used.

A mobile station may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

At least one of a base station and a mobile station may be referred to as a transmitting device, a receiving device, a communication device, or the like. At least one of a base station and a mobile station may be a device mounted in a mobile object or a mobile object itself. The mobile object may be a vehicle (for example, an automobile or an aircraft), may be an unmanned mobile object (for example, a drone or an automated-driving vehicle), or may be a robot (a manned type or an unmanned type). At least one of a base station and a mobile station may include a device that is not moving at the time of performing a communicating operation. For example, at least one of a base station and a mobile station may be an Internet of things (IoT) such as a sensor.

A base station in the present disclosure may be replaced with a user terminal. For example, the aspects/embodiments of the present disclosure may be applied to a configuration in which communication between a base station and a user terminal is replaced with communication between a plurality of user terminals (which may be referred to as, for example, device-to-device (D2D) or vehicle-to-everything (V2X)). In this case, a configuration in which the functions of a base station 3 are provided in a mobile terminal 2 may be employed. Terms "uplink" and "downlink" may be replaced with a term corresponding to inter-terminal communication (for example, "side"). For example, an uplink channel or a downlink channel may be replaced with a side channel.

Similarly, a user terminal in the present disclosure may be replaced with a base station. In this case, a configuration in which the functions of a mobile terminal 2 are provided in a base station 3 may be employed.

The term "determining" or "determination" used in the present disclosure may include various types of operations. The term "determining" or "determination" may include cases in which judging, calculating, computing, processing, deriving, investigating, looking up, search, or inquiry (for example, looking up in a table, a database, or another data structure), and ascertaining are considered to be "determined." The term "determining" or "determination" may include cases in which receiving (for example, receiving information), transmitting (for example, transmitting information), input, output, and accessing (for example, accessing data in a memory) are considered to be "determined." The term "determining" or "determination" may include cases in which resolving, selecting, choosing, establishing, comparing, and the like are considered to be "determined." That is, the term "determining" or "determination" can include cases in which a certain operation is considered to be "determined." "Determining" may be replaced with "assuming," "expecting," "considering," or the like.

The terms "connected" and "coupled" or all modifications thereof refer to all direct or indirect connecting or coupling between two or more elements, and can include a case in which one or more intermediate elements are present between the two elements "connected" or "coupled" to each other. Coupling or connecting between elements may be physical, logical, or a combination thereof. For example, "connecting" may be replaced with "access." In the present disclosure, two elements can be considered to be "connected" or "coupled" to each other using at least one of one or more electrical wires, cables, and printed circuits and using electromagnetic energy or the like having wavelengths of a radio frequency area, a microwave area, and a light (both visible and invisible light) area in some non-limiting and non-inclusive examples.

The expression "based on" used in the present disclosure does not mean "based on only" unless otherwise described. In other words, the expression "based on" means both "based on only" and "based on at least."

No reference to elements named with "first," "second," or the like used in the present disclosure generally limit amounts or order of the elements. These naming can be used in the present disclosure as a convenient method for distinguishing two or more elements. Accordingly, reference to first and second elements does not mean that only two elements are employed or that a first element precedes a second element in any form.

"Means" in the configuration of the aforementioned devices may be replaced with "unit," "circuit," "device," or the like.

When the terms "include" and "including" and modifications thereof are used in the present disclosure, the terms are intended to have a comprehensive meaning similar to the term "comprising." The term "or" used in the present disclosure is not intended to mean an exclusive logical sum.

In the present disclosure, for example, when an article such as a, an, or the in English is added in translation, the present disclosure may include a case in which a noun subsequent to the article is of a plural type.

In the present disclosure, the expression "A and B are different" may mean that "A and B are different from each other." The expression may mean that "A and B are different from C." Expressions such as "separated" and "coupled" may be construed in the same way as "different."

REFERENCE SIGNS LIST

1 Environment estimation device
2 Mobile terminal
3 Base station
4 Network
5 Environment estimation system
10 Information acquiring unit
11 Information storage unit
12 Information computing unit
13 Estimation unit
20 Positioning unit
21 Positioning information storage unit
22 Positioning information transmitting unit

The invention claimed is:

1. An environment estimation device that is comprised in a communication system comprising a plurality of pieces of radio equipment and a mobile terminal capable of performing radio communication with each of the plurality of pieces of radio equipment when the mobile terminal is served in a radio communication range of the corresponding radio equipment, the environment estimation device comprising processing circuitry configured to:

store radio equipment information in which a serving timing at which the mobile terminal is served in the radio communication range of the radio equipment and environment information indicating an environment of the radio equipment are correlated;

acquire position information comprising position data of the mobile terminal acquired by positioning and a positioning timing; and estimate, based on the positioning timing comprised in the acquired position information of the mobile terminal and the stored radio equipment information, an environment of the mobile terminal at a position indicated by the position data comprised in the position information, wherein the processing circuitry estimates the environment of the mobile terminal based on an environment correlated with the radio equipment information at the serving timing which is included in a predetermined time including the positioning timing in the radio equipment information.

2. The environment estimation device according to claim 1, wherein the environment comprises at least one of being indoors or being outdoors.

3. The environment estimation device according to claim 1, wherein the processing circuitry estimates the environment of the mobile terminal based on a proportion of an environment correlated with each of the radio equipment information at the serving timing which is included in the predetermined time including the positioning timing in the radio equipment information.

4. The environment estimation device according to claim 1, wherein the processing circuitry estimates the environment of the mobile terminal additionally based on a difference between the serving timing and the positioning timing.

5. An environment estimation device that is comprised in a communication system comprising a plurality of pieces of radio equipment and a mobile terminal capable of performing radio communication with each of the plurality of pieces of radio equipment when the mobile terminal is served in a radio communication range of the corresponding radio equipment, the environment estimation device comprising processing circuitry configured to:
  store radio equipment information in which a serving timing at which the mobile terminal is served in the radio communication range of the radio equipment and environment information indicating an environment of the radio equipment are correlated;
  acquire position information comprising position data of the mobile terminal acquired by positioning and a positioning timing; and
  estimate, based on the positioning timing comprised in the acquired position information of the mobile terminal and the stored radio equipment information, an environment of the mobile terminal at a position indicated by the position data comprised in the position information,
  wherein the processing circuitry acquires position information in which a position indicated by position data is included in a designated area in position information, and
  wherein the processing circuitry estimates the environment of the mobile terminal in the designated area based on estimated environments of the mobile terminal at each of positions.

6. The environment estimation device according to claim 5, wherein the environment comprises at least one of being indoors or being outdoors.

7. The environment estimation device according to claim 5, wherein the processing circuitry estimates the environment of the mobile terminal based on an environment correlated with the radio equipment information at the serving timing closest to the positioning timing in the radio equipment information.

8. The environment estimation device according to claim 7, wherein the processing circuitry estimates the environment of the mobile terminal additionally based on a difference between the serving timing and the positioning timing.

9. The environment estimation device according to claim 5, wherein the designated area is an area without an above ground building.

10. An environment estimation device that is comprised in a communication system comprising a plurality of pieces of radio equipment and a mobile terminal capable of performing radio communication with each of the plurality of pieces of radio equipment when the mobile terminal is served in a radio communication range of the corresponding radio equipment, the environment estimation device comprising processing circuitry configured to:
  store radio equipment information in which a serving timing at which the mobile terminal is served in the radio communication range of the radio equipment and environment information indicating an environment of the radio equipment are correlated;
  acquire position information comprising position data of the mobile terminal acquired by positioning and a positioning timing; and
  estimate, based on the positioning timing comprised in the acquired position information of the mobile terminal and the stored radio equipment information, an environment of the mobile terminal at a position indicated by the position data comprised in the position information,
  wherein the processing circuitry acquires position information in which a position indicated by position data is included in a designated area in position information of mobile terminals which are carried by each of a plurality of users, and
  wherein the processing circuitry calculates a user proportion for each environment in the designated area based on estimated environments of each of mobile terminals at each of positions.

11. The environment estimation device according to claim 10, wherein the environment comprises at least one of being indoors or being outdoors.

12. The environment estimation device according to claim 10, wherein the processing circuitry estimates the environment of the mobile terminal based on an environment correlated with the radio equipment information at the serving timing closest to the positioning timing in the radio equipment information.

13. The environment estimation device according to claim 12, wherein the processing circuitry estimates the environment of the mobile terminal additionally based on a difference between the serving timing and the positioning timing.

14. The environment estimation device according to claim 10, wherein the designated area is an area without an above ground building.

* * * * *